UNITED STATES PATENT OFFICE.

OLIVIER LOUIS ANDRÉ DUBOSC, ARMAND DIÉ LUTTRINGER, AND HECTOR DENIS, OF PARIS, FRANCE, ASSIGNORS TO SOCIÉTÉ LE CAMPHRE, OF PARIS, FRANCE.

MANUFACTURE OF FORMATES.

1,019,230. Specification of Letters Patent. Patented Mar. 5, 1912.

No Drawing. Application filed February 6, 1911. Serial No. 606,945.

*To all whom it may concern:*

Be it known that we, OLIVIER LOUIS ANDRÉ DUBOSC, ARMAND DIÉ LUTTRINGER, and HECTOR DENIS, of Paris, France, have invented certain new and useful Improvements in the Manufacture of Formates, of which the following is a full and clear description.

It is known that alkali formates or alkaline earth formates can be obtained by the action of carbon monoxid in presence of water on the corresponding bases in the solid state or in solution or in suspension. This mode of manufacture has the inconvenience that it necessitates the use of gases under considerable pressure and in consequence an installation voluminous and complicated. Moreover, and in particular, when the carbon monoxid is caused to react on a solid base the reaction is not complete and the formate obtained is mixed with an excess of the base. It has heretofore been proposed to prepare formates by the action of carbon-monoxid on ammonia in the gaseous state.

According to the present invention formates may be very easily prepared by the action of moist carbon monoxid on other bases in the form of gas or vapor, such as the methylamins, pyridins, or the like, and it is the object of the present invention to provide such a process.

There are several modes of performing the reaction. The moist carbon monoxid and the base in a state of vapor may be caused to enter the reaction chamber independently of each other, or the moist oxid of carbon monoxid and the base may be previously mixed, for example by passing the carbon monoxid through the base in question or by evaporating the base into an atmosphere of the carbon monoxid, or in any other manner. For example there is caused to enter into a reaction chamber heated to 130° C., containing pumice-stone saturated with cuprous chlorid, on the one hand a current of moist carbon monoxid and on the other hand a jet of vapor of crude methylamin previously heated to 125–130° C. The gases mix and combine resulting in the formation of formates:

$$CO + H_2O + CH_3-NH_2 = H-CO-O-NH_3-CH_3.$$

The gases may be mixed, however, before entering the reaction-chamber.

The reaction chamber preferably consists of a tube or a bundle of tubes heated in any suitable manner to the desired temperature.

The reaction occurs at the ordinary pressure and as it is always possible to make an intimate mixture of the two gaseous materials the base used is completely transformed into formate. The reaction of the moist carbon monoxid on the base under consideration occurs at a suitable temperature in presence of an inert mass impregnated or not with a catalytic agent and inclosed in a reaction chamber.

The carbon monoxid used may be derived from any industrial source, that is to say it may be diluted with inert gases.

As inert masses there may be used very varied materials; notably brick, sand-stone, pumice-stone, asbestos, salts of magnesium, or the like.

The catalytic agents may consist of metallic salts or oxids or metals precipitated on the inert mass. Bodies which give particularly good results are copper, titanium, vanadium, nickel, iron, platinum, or their oxids or salts.

The temperature varies, according to the inert mass, and the catalytic agent employed, between 90° C. and 165° C.

The formates obtained may either be condensed and collected or be treated directly by an acid to transform them into formic acid.

What is claimed is:—

1. The process of making formates which comprises reacting with moist carbon monoxid on an organic base in a gaseous or vaporous state.

2. The process of making formates, wherein moist carbon monoxid is caused to act upon an organic base in a gaseous or vaporous state at atmospheric pressure.

3. The process of making formates, wherein moist carbon monoxid is caused to act upon an organic base in a gaseous or vaporous state at a temperature between 90° and 165°.

4. The process of making formates, wherein moist carbon monoxid is caused to act upon an organic base in a gaseous or vaporous state in the presence of an inert mass.

5. The process of making formates, wherein moist carbon monoxid is caused to act

2 upon an organic base in a gaseous or vaporous state in the presence of a catalytic agent.

6. The process of making formates, wherein moist carbon monoxid is caused to act upon methylamin in a gaseous or vaporous state.

In witness whereof we have hereunto signed our names this 24 day of January 1911, in the presence of two subscribing witnesses.

OLIVIER LOUIS ANDRÉ DUBOSC.
ARMAND DIÉ LUTTRINGER.
HECTOR DENIS.

Witnesses:
H. C. COXE,
GABRIEL BELLIARD.

---

Copies of this patent may be obtained for five cents each, by addressing the "Commissioner of Patents, Washington, D. C."